H. W. Hindsley,
Piano Key,
Nº 27,050.      Patented Feb. 7, 1860.

Witnesses:
S. Thompson
R. Fitzgerald

Inventor:
Henry W. Hindsley

UNITED STATES PATENT OFFICE.

HENRY WM. HINDSLEY, OF NEW HAVEN, CONNECTICUT.

PIANOFORTE-KEY.

Specification of Letters Patent No. 27,050, dated February 7, 1860.

*To all whom it may concern:*

Be it known that I, HENRY W. HINDSLEY, of the city and county of New Haven, in the State of Connecticut, have invented a new and useful Improvement in the Black Keys for Pianofortes, &c., as a New Article of Manufacture; and I do hereby declare that the following is a full, clear, and exact description of the construction, character, and operation of the same, reference being had to the accompanying drawings, which make part of this specification, in which—

Figure 1:
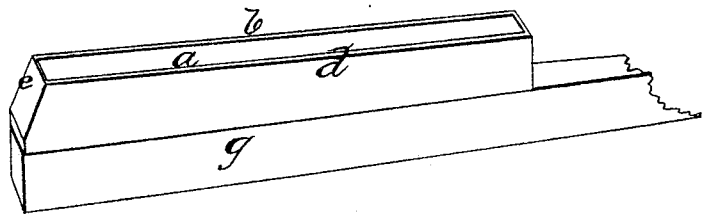
Figure 2:
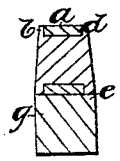

Figure 1, is a perspective view of one of the upper, or projecting parts, of the black key, attached to the wood, or main, part of the key. Fig. 2, a cross section of the same, showing the glass in its relative position in the composition.

My improvement consists in making the upper, or projecting part of the black keys for piano-fortes, &c. of a composition of gum lac and sawdust, (or any other suitable substance) mixed with gum lac, as commonly used for daguerreotype cases, &c, with a plate, or slip, of glass pressed into the upper surface to keep the surface smooth, and also to serve as an ornament.

I prepare the composition of gum lac and sawdust, (or other substance,) in the same manner as for daguerreotype cases,—or otherwise.

I make a die, or mold, of steel, or any other suitable material, so that the inside shall be exactly the size,—and shape, of the upper, or projecting, part of one of the black keys, for piano-fortes, &c. In the bottom of this die, or mold, I place a slip, or piece, of glass, not quite so long, or wide, as the mold, as shown at *a*, Fig. 1, and indicated, in section, at *a*, Fig. 2. I then warm the composition until it becomes sufficiently plastic to take an impression, with well defined outlines;—(and I also warm the mold, when thought best.) I fill the mold with the composition, (in such plastic state,) and apply sufficient pressure to cause it to conform, with exactness, to the inside of the mold, so that some of the composition will pass between the edges, and ends, of the glass and the mold, so as to inclose the perimeter of the glass in an adhering bevel which will coincide, in regard to level, on the upper surface, with the glass, as shown in Figs. 1, and 2, so that when the composition is cooled it will not only adhere to the glass, but will firmly clasp its entire perimeter, as seen at *b*, *c*, & *d*, Fig. 1. I attach this upper portion to the wood,—or main, part, *g*, of the key by any suitable cement:—(and, if thought best, a slip of straw-board, or wood, may be pressed into the under surface of the composition, as indicated, in section, at *e*, Fig. 2, when it may be attached to the wood by common glue.)

The advantages of my improvement consist in the brilliant lustre which the glass gives to the top of the key; and, in that the luster will be retained for an almost unlimited space of time,—while those made of ebony, or composition, only, will soon loose their luster by use; and, in that by forming a complete bevel for the glass, (of the composition,) the edges of the glass will need no dressing after being cut with a diamond, thus rendering the glass of but trifling expense.

I am aware that the composition of gum lac and sawdust,—&c. has been used for various purposes, and, that glass has been attached to the surface of iron, and various other substances, by cement, or some other adhesive ingredient being introduced between them,—(in which cases the glass is liable to be knocked off, or even to drop off.) I, therefore, do not claim either of these as my invention, but

What I claim as my invention, and desire to secure by Letters Patent, is—

The combination of the glass with the composition, when the two are connected without the use of any intervening adhesive substance, and the article is constructed, and fitted for use, substantially, as herein described.

HENRY WM. HINDSLEY.

Witnesses:
G. HINDSLEY,
R. FITZGERALD.